(12) United States Patent
Chiang et al.

(10) Patent No.: US 9,164,895 B2
(45) Date of Patent: *Oct. 20, 2015

(54) VIRTUALIZATION OF SOLID STATE DRIVE AND MASS STORAGE DRIVE DEVICES WITH HOT AND COLD APPLICATION MONITORING

(71) Applicant: Marvell World Trade Ltd., St. Michael (BB)

(72) Inventors: Hsing-Yi Chiang, Taipei (TW); Xinhai Kang, Milpitas, CA (US); Qun Zhao, Pleasanton, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,446

(22) Filed: Jun. 25, 2014

(65) Prior Publication Data
US 2014/0310449 A1    Oct. 16, 2014

Related U.S. Application Data

(63) Continuation of application No. 12/950,733, filed on Nov. 19, 2010, now Pat. No. 8,769,241.

(60) Provisional application No. 61/266,924, filed on Dec. 4, 2009.

(51) Int. Cl.
*G06F 12/00* (2006.01)
*G06F 12/02* (2006.01)
(Continued)

(52) U.S. Cl.
CPC .......... *G06F 12/0246* (2013.01); *G06F 3/0604* (2013.01); *G06F 3/068* (2013.01); *G06F 3/0611* (2013.01); *G06F 3/0664* (2013.01); *G06F 12/109* (2013.01); *G06F 2212/7201* (2013.01)

(58) Field of Classification Search
CPC .... G06F 3/0664; G06F 3/0665; G06F 3/0685; G06F 12/109; G06F 3/0613; G06F 3/0631
USPC .......................... 711/203, 5, 6, 103, 105, 202
See application file for complete search history.

(56) References Cited

U.S. PATENT DOCUMENTS

| 6,016,530 A | 1/2000 | Auclair et al. |
| 8,190,815 B2 | 5/2012 | Kakihara et al. |

(Continued)

FOREIGN PATENT DOCUMENTS

| EP | 0564699 | 10/1993 |
| EP | 1710674 | 10/2006 |

(Continued)

OTHER PUBLICATIONS

Coenen, Jean-Pierre, Authorized Officer, European Patent Office, PCT International Application No. PCT/US10/057495, in International Search Report, mailed Feb. 11, 2011, 11 pages.

(Continued)

*Primary Examiner* — Hong Kim

(57) ABSTRACT

Systems and techniques relating to storage technologies include, according to an aspect, a data processing apparatus including: a processor; a controller coupled with the processor; a solid state drive coupled with the controller; and a mass storage drive coupled with the controller; wherein at least a portion of the solid state drive and the mass storage drive are virtualized as a single physical storage drive; wherein multiple applications stored in the virtualized single physical storage drive are configured to run on the processor; wherein one or more applications in a hot application group are stored in the solid state drive, and one or more applications in a cold application group are stored in the mass storage drive; and wherein each of the multiple applications is actively monitored and placed in either the hot application group or the cold application group.

14 Claims, 11 Drawing Sheets

(51) Int. Cl.
*G06F 3/06* (2006.01)
*G06F 12/10* (2006.01)

(56) References Cited

U.S. PATENT DOCUMENTS

| | | | |
|---|---|---|---|
| 8,769,241 B2 * | 7/2014 | Chiang et al. | 711/203 |
| 2005/0235076 A1 | 10/2005 | Winarski et al. | |
| 2007/0271413 A1 * | 11/2007 | Fujibayashi et al. | 711/112 |
| 2009/0030868 A1 * | 1/2009 | Radhakrishnan et al. | 707/1 |
| 2009/0049234 A1 | 2/2009 | Oh et al. | |
| 2009/0144483 A1 * | 6/2009 | Sakurai et al. | 711/100 |
| 2009/0287878 A1 * | 11/2009 | Yamamoto et al. | 711/103 |
| 2010/0037041 A1 * | 2/2010 | Joshi et al. | 713/2 |
| 2010/0262752 A1 | 10/2010 | Davis et al. | |
| 2010/0281230 A1 | 11/2010 | Rabii et al. | |
| 2011/0035548 A1 * | 2/2011 | Kimmel et al. | 711/114 |
| 2011/0179235 A1 * | 7/2011 | Lee et al. | 711/154 |
| 2011/0258379 A1 * | 10/2011 | Hayashi | 711/114 |

FOREIGN PATENT DOCUMENTS

| | | |
|---|---|---|
| EP | 1873624 | 1/2008 |
| JP | 9297659 A | 11/1997 |
| JP | 10063551 A | 3/1998 |
| WO | 2008139447 | 11/2008 |
| WO | 2009102425 | 8/2009 |

OTHER PUBLICATIONS

Jo et al., "SSD-HDD-Hybrid Virtual Disk in Consolidated Environments," Aug. 25, 2009, Euro-Par 2009, Parallel Processing Workshops, 10 pages.

Notice of Reasons for Rejection, Japanese Application No. 2012-542078, dated Sep. 2, 2014, 4 pages.

* cited by examiner

VIRTUALIZATION OF SOLID STATE DRIVE AND MASS STORAGE DRIVE DEVICES WITH HOT AND COLD APPLICATION MONITORING

CROSS REFERENCE TO RELATED APPLICATION

This disclosure is a continuation application of (and claims the benefit of priority to) U.S. application Ser. No. 12/950,733, filed Nov. 19, 2010 and entitled "VIRTUALIZATION OF STORAGE DEVICES," now U.S. Pat. No. 8,769,241, which claims the benefit of the priority of U.S. Provisional Application Ser. No. 61/266,924, filed on Dec. 4, 2009 and entitled "Hyper SSD," which is incorporated herein by reference in its entirety.

BACKGROUND

This disclosure relates to storage technologies.

Data processing systems such as computer systems can use one or more storage devices to store and retrieve information. Various examples of storage devices include solid state drives (SSDs), tape drives, and disk drives such as hard disk drives (HDDs) and optical drives. A SSD can include non-volatile memory such as flash memory. A storage device can store files such as operating system files and application files. A SSD may provide lower latency than a HDD, whereas a HDD may provide a greater storage capacity than a SSD.

SUMMARY

The present disclosure includes systems and techniques related to storage technologies including, among other things, virtual drives.

According to an aspect of the described systems and techniques, a method for use with storage technologies includes operating drives including a solid state drive (SSD) and a disk drive, where the SSD and the disk drive are virtualized as a single logical drive having a logical address space, where the logical drive maps logical block addresses to the SSD and to the disk drive. The technique includes determining, based on a file to be written to the logical drive, a target logical address that corresponds to one of the SSD and the disk drive, and writing the file to the logical drive at the target logical address to effect storage on one of the SSD and the disk drive. In some implementations, operating drives includes operating a SSD and a mass storage device such as a tape drive. In some implementations, operating drives includes operating a first drive that is faster than a second drive, where the first drive has a smaller capacity than the second drive. Determining a target logical address can include using a characteristic of a file to select a target logical address. Determining the target logical address can include selecting one of the first address range and the second address range.

According to another aspect of the described systems and techniques, a method for use with storage technologies includes operating drives including a SSD and a disk drive, virtualizing the SSD and the disk drive to be a single logical drive with a logical address space, where the logical drive maps logical block addresses to the SSD and to the disk drive, selecting, based on a characteristic of a file to be written to the logical drive, a target logical address that corresponds to one of the SSD and the disk drive, and writing the file to the logical drive at the target logical address to effect storage on one of the SSD and the disk drive. The method can virtualize the SSD and the disk drive to be a single logical drive with a logical address space of 0 to L, where L is greater than 0. Virtualizing can include mapping logical block addresses of a first address range of the logical address space to the SSD and logical block addresses of a second, different address range of the logical address space to the disk drive.

Implementations can include monitoring usage information of files associated with the logical drive. In some implementations, the characteristic of the file is based on the usage information such as a relative usage frequency. Selecting the target logical address can include using the usage information to select one of the SSD and the disk drive. In some cases, the file was previously stored on the disk drive. Selecting the target logical address can include selecting a target logical address that corresponds to the SSD. Writing the file to the logical drive can include moving the file from the disk drive to the SSD to decrease a read access latency of the file. In some cases, the file is already stored on the SSD. Writing the file to the logical drive can include moving, based on respective usage information, the file stored on the SSD to the disk drive to increase available space on the SSD. Implementations can include monitoring usage information of files associated with the logical drive. Determining the target logical address can include using the usage information to select one of the SSD and the disk drive.

Implementations can include identifying a type of the file associated with the logical drive. The characteristic of the file can include the type. Selecting the target logical address can include selecting a target logical address that corresponds to the SSD based on a latency requirement of the type of file. Writing the file to the logical drive can include writing the file to the SSD.

Virtualizing the SSD and the disk drive can include mapping logical block addresses of a first address range from 0 to K to the SSD and logical block addresses of a second address range from K+1 to L to the disk drive, where L is greater than K, and K is greater than 0. Writing the file to the logical drive can include causing a controller to select, based on the target logical address, one of the SSD and the disk drive, and write the file to the selected drive.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses can include a first interface to communicate with a SDD, a second interface to communicate with a disk drive, and processor electronics to communicate with the drives and map logical block addresses in a logical address space of 0 to L, where L is greater than 0. The SSD and the disk drive can be virtualized as a single logical drive. In some implementations, the processor electronics map logical block addresses of a first address range of the logical address space to the SSD and logical block addresses of a second, different address range of the logical address space to the disk drive. In some implementations, the processor electronics are configured to perform operations that include determining, based on a file to be written to the logical drive, a target logical address that corresponds to one of the SSD and the disk drive, and writing the file to the logical drive at the target logical address to effect storage on one of the SSD and the disk drive.

These and other implementations can include one or more of the following features. Determining a target logical address can include using a characteristic of a file to select a target logical address. The operations can include monitoring usage information of files associated with the logical drive. In some implementations, the characteristic of the file is based on the usage information. Selecting the target logical address can include using the usage information to select one of the SSD and the disk drive. In some cases, the file is already stored on the disk drive. Selecting the target logical address can include selecting a target logical address that corresponds to the SSD. Writing the file to the logical drive can include moving the file from the disk drive to the SSD to decrease a read access latency of the file. In some cases, the file is already stored on the SSD. Writing the file to the logical drive can include moving, based on respective usage information, the file stored on the SSD to the disk drive to increase available space on the SSD.

Implementations can include the action of identifying a type of the file associated with the logical drive. The characteristic of the file can include the type. Selecting the target logical address can include selecting a target logical address that corresponds to the SSD based on a latency requirement of the type of file. Writing the file to the logical drive can include writing the file to the SSD.

In some implementations, the SSD is partitioned into extents, wherein the virtualizing can include virtualizing an extent of the extents and the disk drive to be the single logical drive. In some implementations, the first address range includes addresses from 0 to K, and the second address range includes addresses from K+1 to L, where L is greater than K, and K is greater than 0.

In another aspect, systems and apparatuses can include a SSD, a disk drive, and processor electronics to communicate with the drives and map logical block addresses in a logical address space of 0 to L. In some implementations, the processor electronics map logical block addresses of a first address range to the SSD and logical block addresses of a second, different address range to the disk drive. In some implementations, the first address range includes addresses from 0 to K and the second address range includes addresses from K+1 to L, where L is greater than K, and K is greater than 0. Determining a target logical address can include selecting one of the first address range and the second address range.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

This disclosure provides details and examples of virtual drive storage technologies. Described systems and techniques include mechanisms for virtualizing physical storage devices, such as a disk drive and a SSD into a virtual drive. Described systems and techniques include mechanisms for moving files between physical drives of a virtual drive to optimize performance of the virtual drive. Using different types of physical drives can provide advantages such as increased access performance and increased storage.

Figure 1:
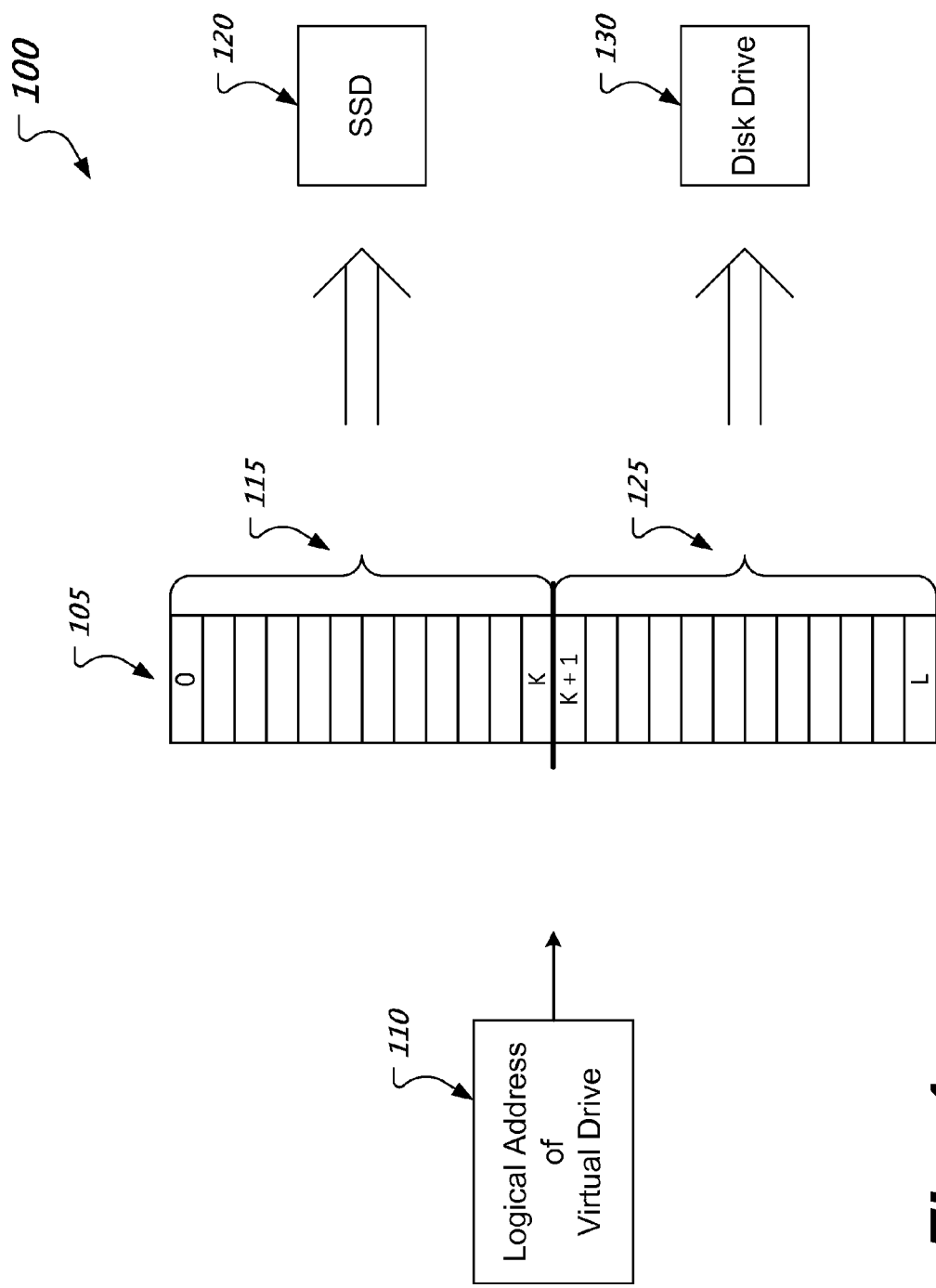
FIG. 1 shows an example of a mapping technique for a virtual drive associated with two physical drives.

FIG. 1 shows an example of a mapping technique for a virtual drive associated with two physical drives. A logical drive can be associated with two or more physical drives such as a SSD 120 and a disk drive 130. A mapping technique 100 maps a logical address 110 such as a logical block address (LBA) of a virtual drive to a logical address suitable for input to one of the physical drives 120, 130 of the virtual drive. In this example, a LBA space 105 is partitioned into first and second address ranges 115, 125. The first range 115 includes addresses from 0 to K. The second range 125 includes addresses from K+1 to L. Here, L is greater than K, and K is greater than 0. A first mapping translates, if required, LBAs in the first range 115 to LBAs suitable for the SSD 120. A second mapping translates LBAs in the second range 125 to LBAs suitable for the disk drive 130. Here, LBAs from K+1 to L are mapped to addresses 0 to L-K, respectively, where address L-K is the maximum logical address value of the disk drive 130.

Based on the mappings, the mapping technique 100 maps a logical block address 110 onto one of multiple address ranges. The address ranges are respectively associated with physical drives 120, 130. The mapping technique 100 is not limited to two physical drives, but can be applied to three or more physical drives, or partitions thereof, that are associated with a virtual drive. Various potential advantages of a virtual drive including a SSD and a disk drive, as described, can include faster boot-up time, faster read and write performance, and increased storage capacity.

Figure 2:
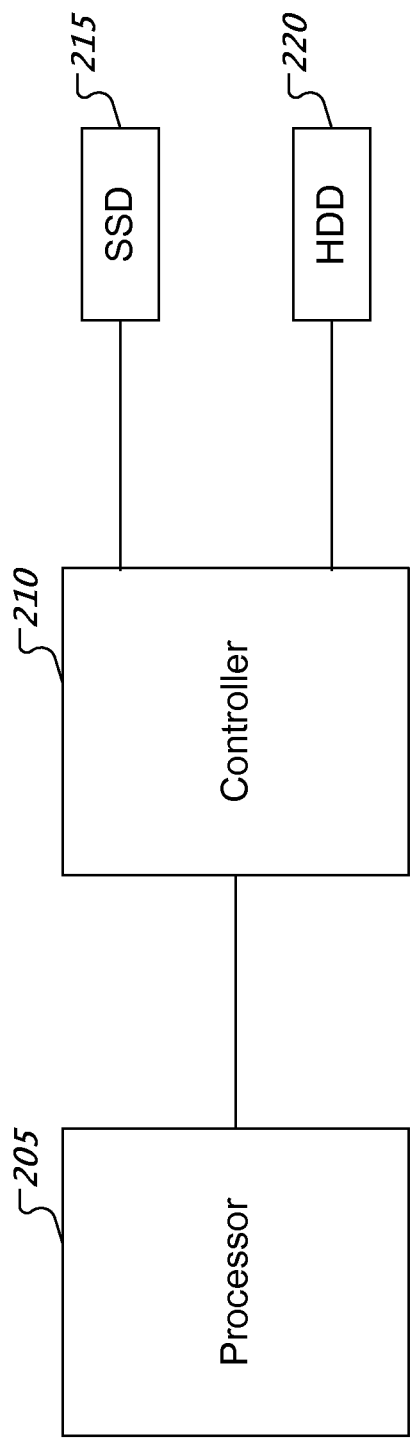
FIG. 2 shows an example of a system architecture that includes a SSD and a HDD.

FIG. 2 shows an example of a system architecture that includes a SSD and a HDD. A processor 205 uses a controller 210 to communicate with two physical drives 215, 220 that are virtualized into a single logical drive. Various examples of physical drives 215, 220 include SSD 215 and HDD 220. In some implementations, the SSD 215 includes NAND flash memory. In some implementations, the SSD 215 includes NOR flash memory. In some implementations, the SSD 120 includes Double Data Rate (DDR) memory with a battery backup.

Various examples of physical interfaces between the processor 205 and the controller 210 include Peripheral Component Interconnect (PCI), PCI Express (PCIe), Serial Advanced Technology Attachment (SATA), Small Computer System Interface (SCSI), Serial Attached SCSI (SAS), Universal Serial Bus (USB), and interfaces for memory cards such as MultiMediaCards (MMCs). Various examples of host software communication protocols include Advanced Host Controller Interface (AHCI), Non-Volatile Memory Host Controller Interface (NVMHCI), Integrated Drive Electronics (IDE), and Intelligent Input/Output (I2O).

In some implementations, a processor 205 uses a mapping technique 100 to control selection of a physical drive 215, 220 to store data to a logical drive. For example, a virtualization process running on a processor 205 can maintain the virtualization of the physical drives 215, 220. An application running on the processor 205 can write to a specific LBA. The virtualization process can transform the LBA into a transformed logical address. The virtualization process can issue a write command to the controller 210 with the transformed logical address and an identification of the target physical drive 215, 220. The processor 205 can write files to the logical drive. In some cases, writing a file to a logical drive includes rewriting the file to the logical drive at a different logical address via a move operation. In some implementations, a processor 205 performs a move operation that includes reading a file from one of the physical drives 215, 220 and writing the file to the other drive. In some implementations, a move operation includes operating a controller 210 to transfer one or more files between physical drives 215, 220.

In some implementations, the controller 210 uses a mapping technique 100 to control selection of a physical drive 215, 220 when processing a write command from a processor 205. For example, a controller 210 can maintain the virtualization of the physical drives 215, 220. The controller 210 can receive a write command produced by an application running on the processor 205. The write command can include a LBA and write data. The controller 210 selects a physical drive 215, 220 based on the LBA included in the write command.

Figure 3:
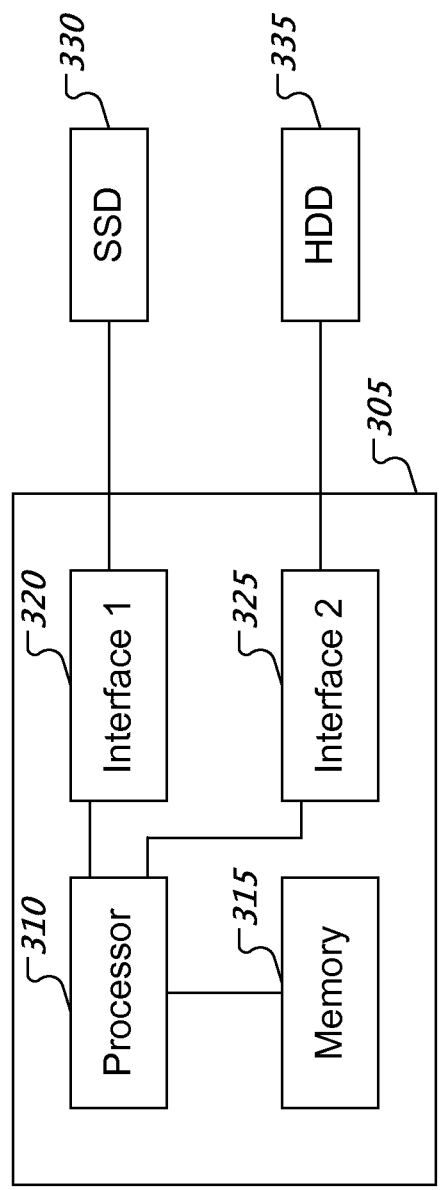
FIG. 3 shows another example of a system architecture that includes a SSD and a HDD.

FIG. 3 shows another example of a system architecture that includes a SSD and a HDD. A data processing system can include processor electronics such as a controller 305. A controller 305 includes one or more processors 310, memory 315, and interfaces 320, 325 for communicating with respective physical drives such as a SSD 330 and a HDD 335. Interfaces 320, 325 for communicating with physical drives can include circuitry to generate address signals, data signals, or both. In some implementations, the controller 305 includes integrated circuitry effecting the processor 310, memory 315, and interfaces 320, 325.

Figure 4:
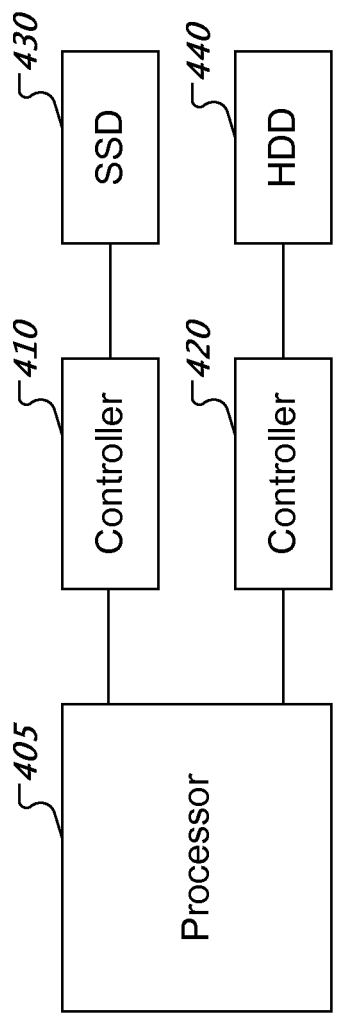
FIG. 4 shows an example of a system architecture that includes dual controllers, a SSD, and a HDD.

FIG. 4 shows an example of a system architecture that includes dual controllers, a SSD, and a HDD. A data processing system can include processor electronics such one or more processors 405 and one or more controllers 410, 420. The processor 405 can communicate with two or more controllers 410, 420 that respectively control two or more physical drives such as a SSD 430 and a HDD 440. The processor 405 can perform a virtualization process to create a virtual drive out of the SSD 430 and the HDD 440.

Figure 5:
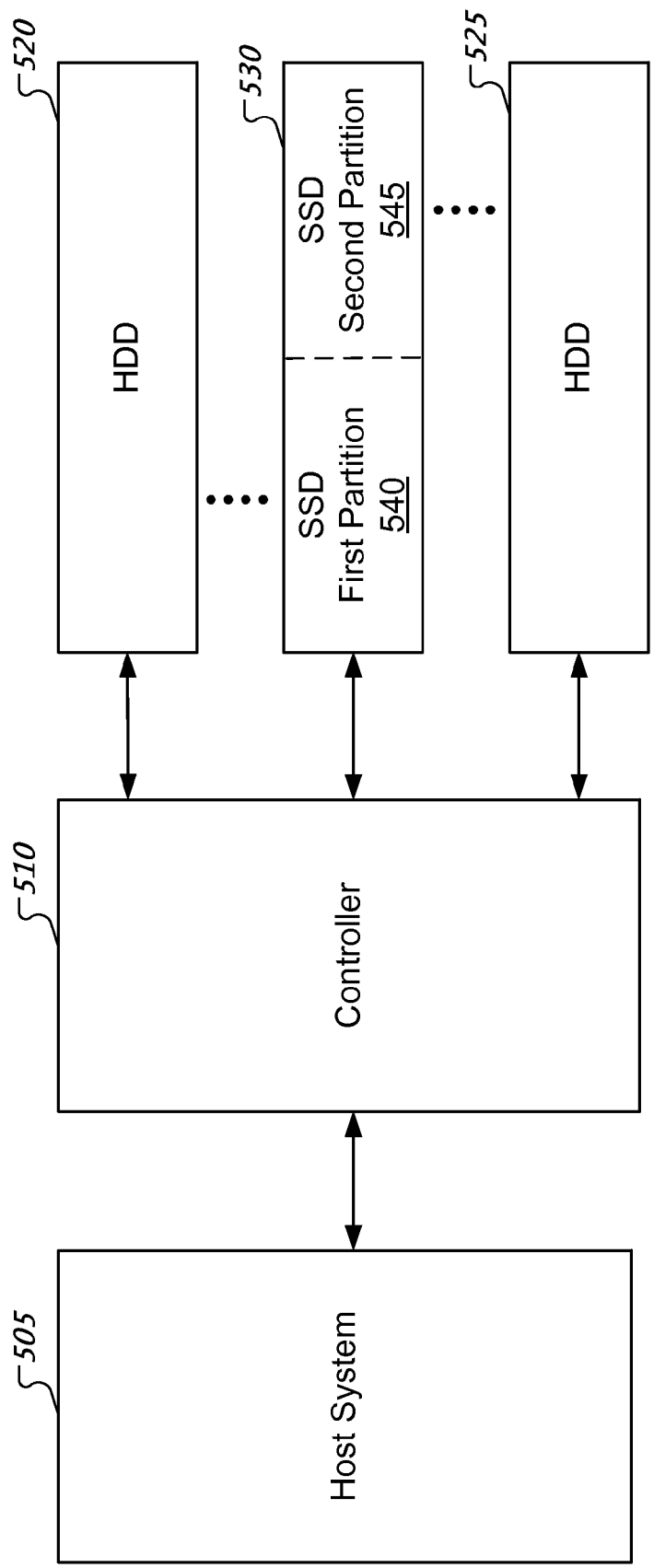
FIG. 5 shows an example of a system architecture that includes two HDDs and a multi-partitioned SDD.

FIG. 5 shows an example of a system architecture that includes two HDDs and a multi-partitioned SDD. A controller 510 can partition a SSD 530 into two or more partitions 540, 545. A partition can be referred to as an extent. The controller 510 can group a first partition 540 of the SSD 530 and a first HDD 520 to create form a first virtual drive. The controller 510 can group a second partition 545 of the SSD 530 and a second HDD 525 to form a second virtual drive. A host system 505 can communicate with either the first or second virtual drive via the controller 510. A host system 505 can include one or more processors. In some implementations, the host system 505 includes the controller 510. A host system 505 can run an operating system (OS) that provides access to a file system stored on a drive, such as a virtual drive or a physical drive. The OS can load a driver that virtualizes physical drives. In some implementations, the OS loads a driver that can communicate with physical drives configured as a virtual drive.

Figure 6:
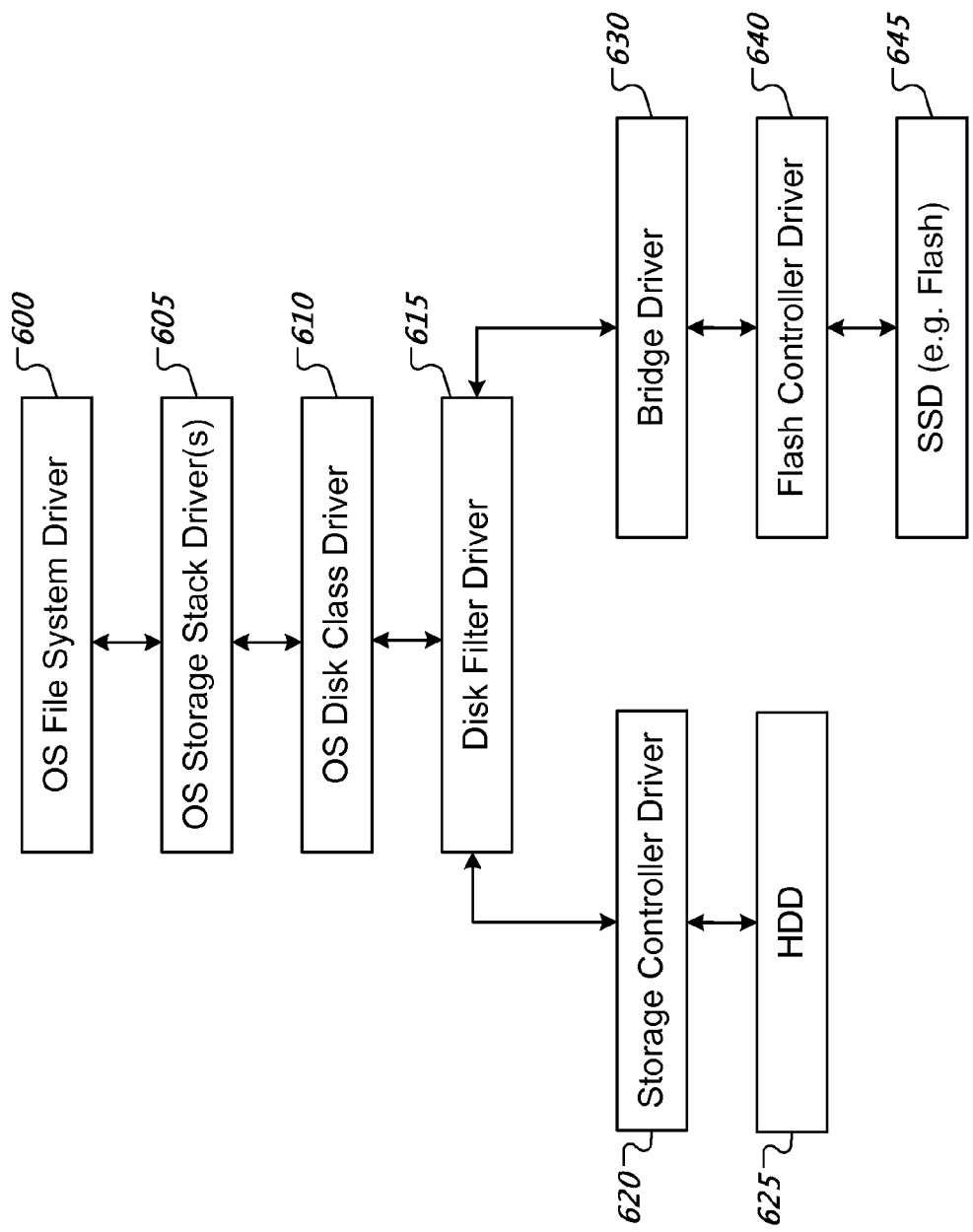
FIG. 6 shows an example of an operating system storage stack architecture.

FIG. 6 shows an example of an operating system storage stack architecture. An operating system storage stack architecture can include an OS file system driver 600, one or more OS storage stack drivers 605, OS disk class driver 610, and disk filter driver 615. The OS file system driver 600 can provide a file system functionality to the operating system and various applications.

The disk filter driver 615 can communicate with multiple drivers associated with different physical drives. The disk filter driver 615 can communicate with a storage controller driver 620 associated with a physical drive such as a HDD 625. The disk filter driver 615 can communicate with another controller driver 640 associated with a physical drive such as a SSD 645. For example, the disk filter driver 615 can communicate with a flash controller driver 640 that is operable to interact with flash memory in a SSD 645.

In some implementations, a bridge driver 630 is communicatively coupled with the disk filter driver 615 and the flash controller driver 640. In some implementations, the bridge driver 630 is operable to translate commands between the disk filter driver 615 and the flash controller driver 640.

In some implementations, the disk filter driver 615 includes functionality to create a virtual drive. In some implementations, the disk filter driver 615 is aware of a controller that combines two or more drives into a virtual drive. In some implementations, one or more drivers such as the OS file system driver 600 are not aware of drives that are virtual and treat such drives as physical drives.

Figure 7:
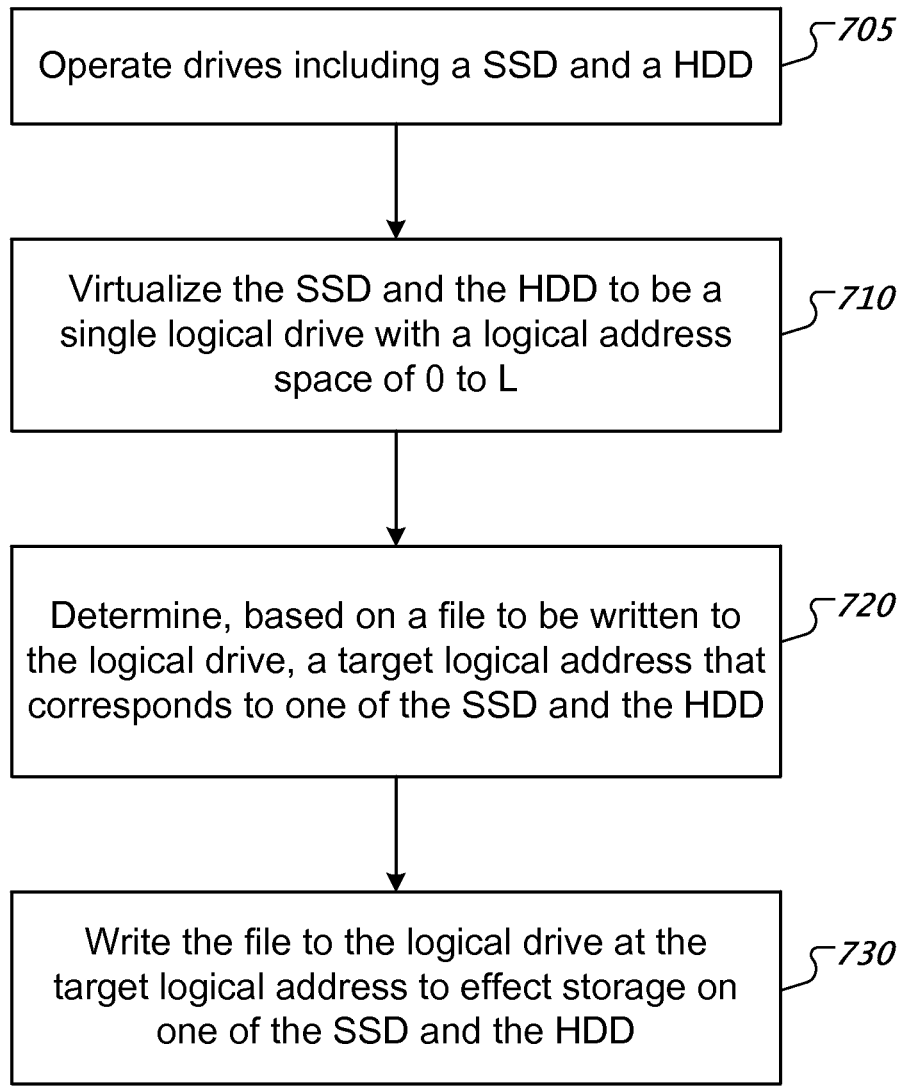
FIG. 7 shows an example of a virtual drive storage process.

FIG. 7 shows an example of a virtual drive storage process. A controller, host system, or combination thereof can run a virtual drive storage process. At 705, the process operates drives including a SSD and a HDD. In some implementations, operating drives includes communicating with a controller that is in communication with the SSD and the HDD. In some implementations, operating drives includes communicating with two or more controllers that are in communication with the SSD and the HDD, respectively. In some implementations, operating drives includes communicating with the SSD and the HDD by a controller, or alternatively without requiring a controller.

At 710, the process virtualizes the SSD and the HDD to be a single logical drive with a logical address space of 0 to L. In some implementations, the process can make the SSD and the HDD appear as a single drive to an operating system. In some implementations, a controller can virtualize physical drives. Virtualization can happen each time a controller and a host system are powered up. In some implementations, virtualization includes accessing a configuration file that specifies physical drive mappings for a virtual drive during an initialization process after power is turned on.

At 720, the process determines, based on a file to be written to the logical drive, a target logical address that corresponds to one of the SSD and the HDD. Determining a target logical address can include selecting a target logical address logical within the logical address space of the logical drive based on a characteristic of the file. For example, an operating system can write a file to a logical drive. The process can identify a characteristic of a file such as a file type or file usage. The process can select a target logical address based on the type such that the file will be written to the SSD. Alternatively, the process selects a different target logical address such that the file will be written to the HDD. In some implementations, a target logical address includes a logical block address. In some implementations, determining a target logical address can include translating a logical address within the logical address space of the logical drive to a logical address within the logical address space of one of the SSD and HDD.

At 730, the process writes the file to the logical drive at the target logical address to effect storage on one of the SSD and the HDD. In some cases, writing the file, at 730, can include moving the file from the SSD to the HDD, or vice versa. In some implementations, the target logical address is based on the logical address space of one of the SSD and HDD. In some implementations, the target logical address is based on the logical address space of the virtual drive.

In some implementations, an operating system's file system driver does not permit external selection of a target logical address. In such implementations, the process can allow the operating system to write to a target logical address that the operating system selects. After an initial write by the operating system, the process, at 720, can select a different target logical address based on a characteristic of a file. For example, if the initial target logical address corresponds to the HDD, then the process can select a target logical address that corresponds to the SSD. The process, at 730, writes the file to the logical drive to move the file to the new target logical address. An operating system may assign logical addresses, e.g., logical block addresses, from lower address values to higher address values. Therefore, it may be advantageous to map a SSD, of a virtual drive, to be at a lower address range than a HDD of the virtual drive such that the initial location of files will be on the SSD as space permits. To manage space on the SSD, a process can move less frequently used files from the SSD to the HDD.

In some implementations, an operating system provides an application programming interface (API) to move files that have been already written to a drive. For example, a storage process can use such an API to move files after an initial write to a drive. In some implementations, an operation system can provide an API to control selection of target logical addresses for an initial write of a file to a drive.

Figure 8:
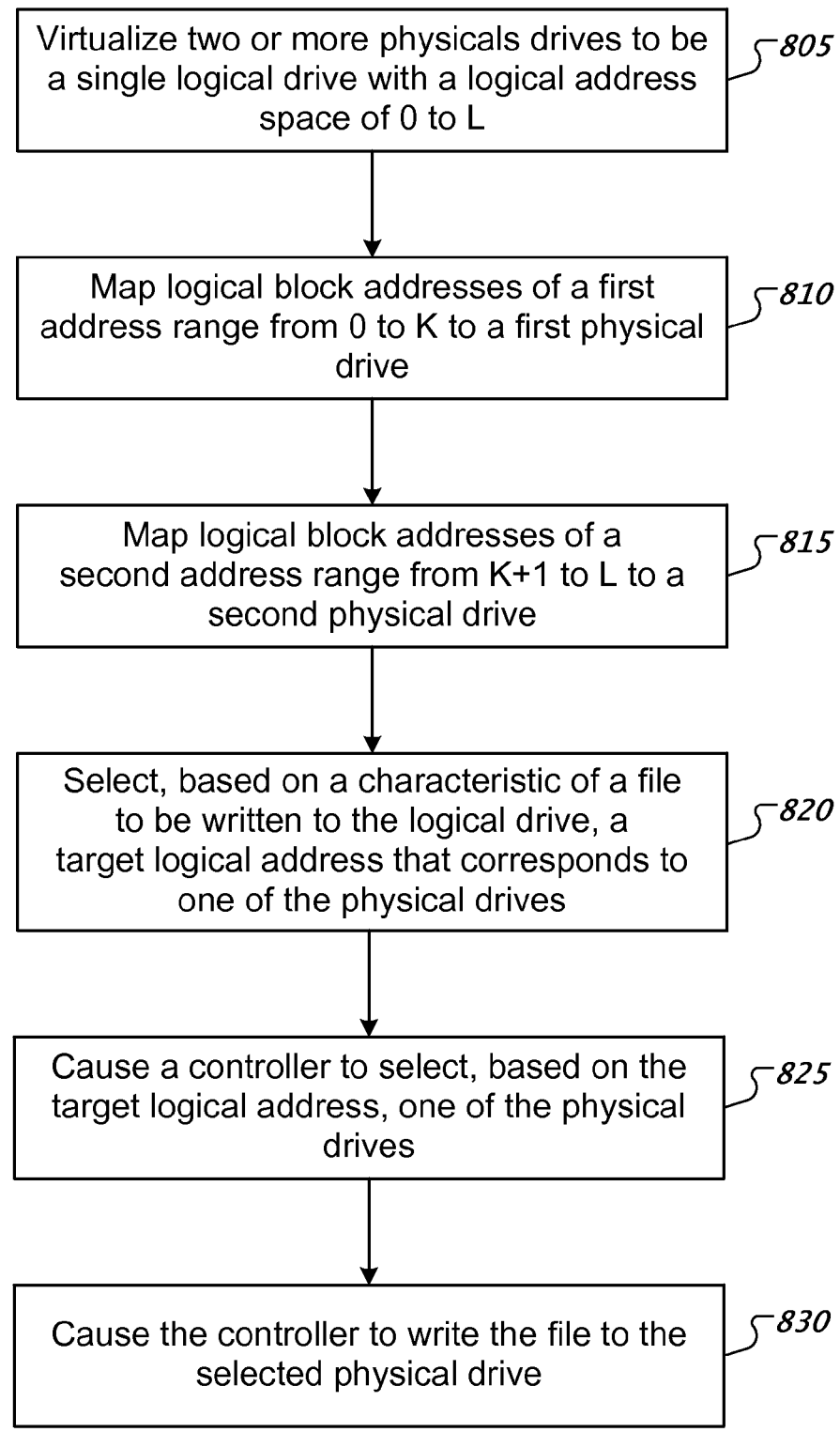
FIG. 8 shows another example of a virtual drive storage process.

FIG. 8 shows another example of a virtual drive storage process. A virtual drive storage process, at 805, virtualizes two or more physicals drives to be a single logical drive with a logical address space of 0 to L. The process, at 810, maps logical block addresses of a first address range from 0 to K to a first physical drive. At 815, the process maps logical block addresses of a second address range from K+1 to L to a second physical drive. Here, L is greater than K, and K is greater than 0.

At 820, the process selects a target logical address that corresponds to one of the physical drives. The process selects a target logical address based on a characteristic of a file to be written to the logical drive. In some implementations, selecting a target logical address includes selecting a target logical address to move a file from one of the physical drives to the other.

At 825, the process causes a controller to select, based on the target logical address, one of the physical drives. Causing a controller to select can include sending a write command to a controller, where the write command includes the target logical address. In some implementations, the process includes a driver identifier in the write command. For example, the controller can select a drive based on a drive identifier in a write command. In some implementations, a portion of the target logical address, e.g., the most significant bit of the target logical address, acts as a drive identifier. In some implementations, the process converts the target logical address into an address that is compatible with an address range associated with the drive. At 830, the process causes the controller to write the file to the selected physical drive. In some implementations, sending a write command to a controller can cause the controller to select one of the physical drives and to write a file to the selected physical drive.

Figure 9:
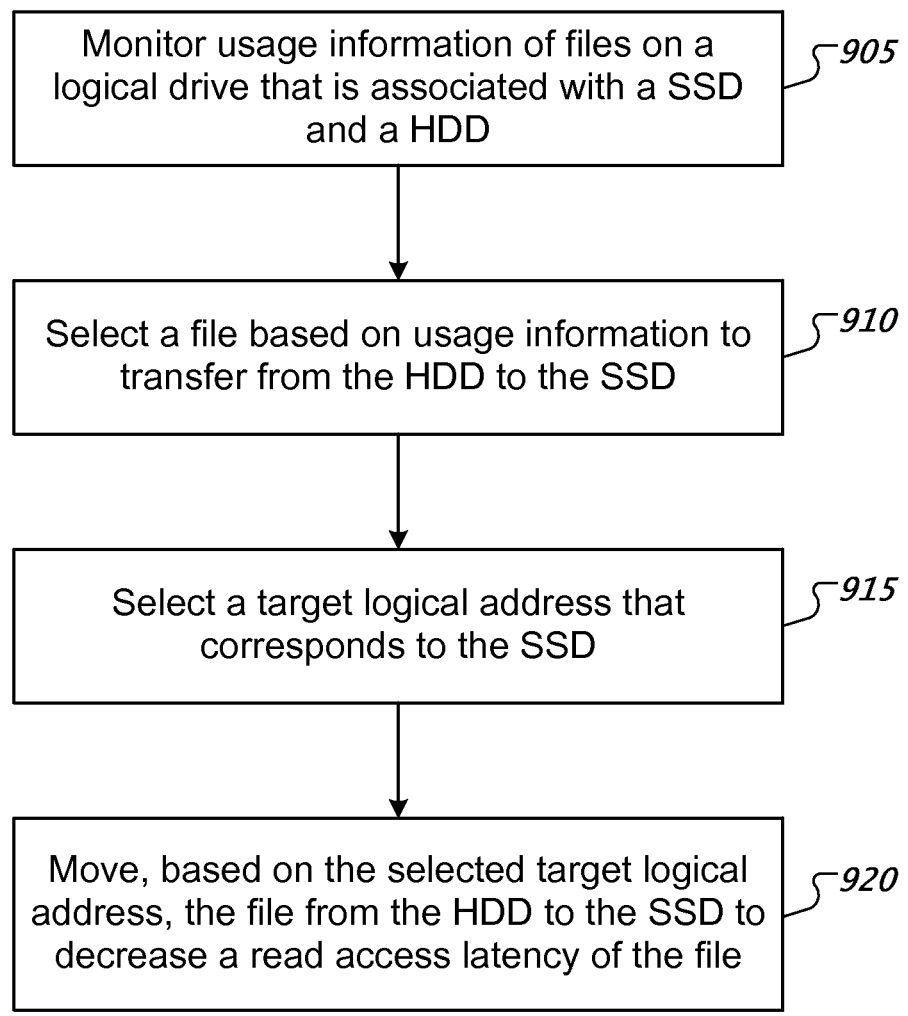
FIG. 9 shows an example of a virtual drive storage process that includes monitoring file usage information.

FIG. 9 shows an example of a virtual drive storage process that includes monitoring file usage information. A virtual drive storage process, at 905, monitors usage information of files on a logical drive that is associated with a SSD and a HDD. At 910, the process selects a file based on usage information such as a usage frequency to move from the HDD to the SSD. Selecting a file based on usage information can including using a relative usage frequency of a file. The process can determine relative usage frequencies of files stored on the logical drive based on a data structure such as a file usage log or table. For example, the process can select one or more files that are used more than other files to move to the SSD. At 915, the process selects a target logical address that corresponds to the SSD. At 920, the process moves, based on the selected target logical address, the file from the HDD to the SSD to decrease a read access latency of the file.

Figure 10:
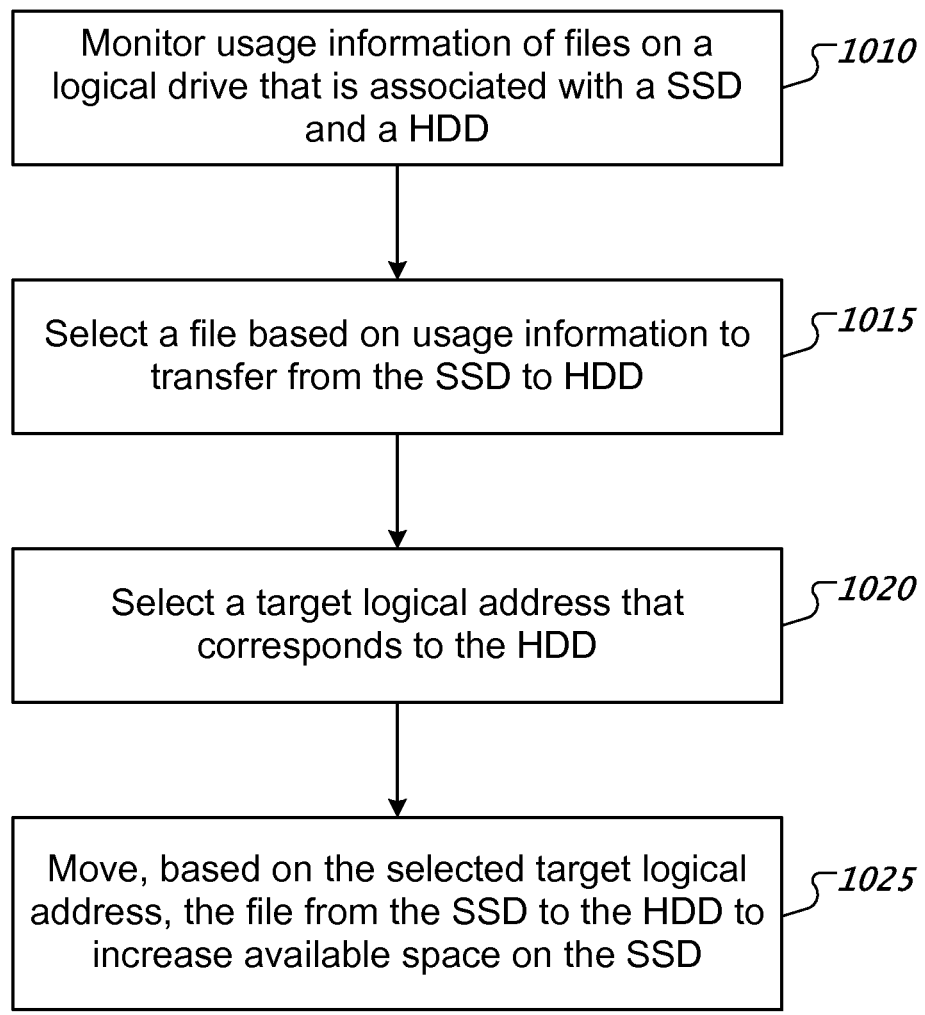
FIG. 10 shows another example of a virtual drive storage process that includes monitoring file usage information.

FIG. 10 shows another example of a virtual drive storage process that includes monitoring file usage information. A storage process, at 1010, monitors usage information of files on a logical drive that is associated with a SSD and a HDD. Monitoring usage information can include accessing an operation system file that tracks file access information such as a last access time or an access count. At 1015, the process selects a file based on usage information to transfer from the SSD to HDD. Selecting a file can include determining a relative usage frequency based on the usage information of two or more files. In some implementations, the process uses a last access time and a date threshold to search for infrequently used files. In this example, a search can be limited to addresses within the address range corresponding to the SSD.

At 1020, the process selects a target logical address that corresponds to the HDD. Selecting such a target logical address can include using a mapping table that identifies one or more address ranges and one or more physical drives, respectively. At 1025, the process moves, based on the selected target logical address, the file from the SSD to the HDD to increase available space on the SSD. Moving a file can include reading the file from the SSD, writing the file to the HDD, and deleting the file from the SSD. Deleting a file can include marking the file as deleted without requiring an erasure of the file.

Figure 11:
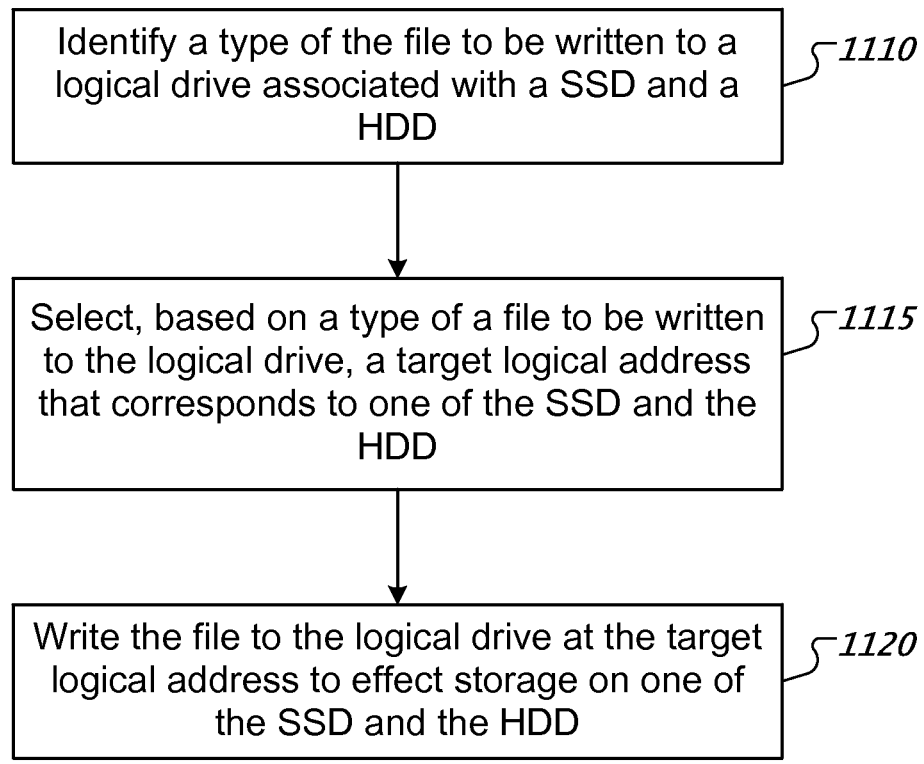
FIG. 11 shows another example of a virtual drive storage process that includes file type identification.

FIG. 11 shows another example of a virtual drive storage process that includes file type identification. A storage process, at 1110, identifies a type of the file to be written to a logical drive associated with a SSD and a HDD. Identifying a type of the file can include identifying a file to be rewritten to the logical drive via a move. Identifying a file type can include accessing a portion of a file name such as a file extension string. In some implementations, identifying a file type can include accessing a portion of a file to determine a file type. In some implementations, identifying a file type can include determining the source of the file, e.g., the owner of the process responsible for sourcing the file to be written. In some implementations, files associated with owners such as "administrator" or "root" can be assigned to the SSD.

At 1115, the process selects, based on a type of a file to be written to the logical drive, a target logical address that corresponds to one of the SSD and the HDD. At 1120, the process writes the file to the logical drive at the target logical address to effect storage on one of the SSD and the HDD. In some implementations, the process includes moving the file from the SSD to the HDD or from the HDD to the SSD. Moving the file can include the selecting, at 1115, and the writing, at 1120.

A host system can run a hyper-drive utility to interact with one or more virtual drives, e.g., hyper-drives. In some implementations, a hyper-drive utility can partition a non-volatile memory into one or more extents. A hyper-drive utility can virtualize a non-volatile memory extent and a HDD as a single disk. A hyper-drive utility can run as a background process. In some implementations, such a utility is included as part of a file system driver.

A hyper-drive utility can optimize the storage of files on a hyper-drive. The hyper-drive utility can place hot (e.g., frequently used) applications into a hyper extent, which resides in a SSD that includes non-volatile memory. For example, the utility can move an executable application file to a hyper extent. The utility can move cold (e.g., rarely used) applications from the hyper extent to a HDD extent. For example, if an application is not used for a period of time, the utility can move files associated with the application from the hyper extent to the HDD extent.

In some implementations, a hyper-drive utility can identify files to assign to the hyper extent based on one or more characteristics such as file type, file usage, or both. The utility can cause storage on the hyper extent of operating system files such as a page file or a swap file. The utility can cause storage on the hyper extent of startup application files. The utility can cause the storage of files associated with frequently used applications on the hyper extent. If there is an update of a hot application, the utility can move the update to the hyper extent. In some implementations, the utility accesses a list of pre-defined file types to determine whether to store a file on the hyper extent.

A virtual drive address space, such as a hyper-drive address space, can include the range [LBA 0, LBA N] being assigned to a SSD and the range [LBA N+1, MAX_LBA] being assigned to a HDD. MAX_LBA represents the maximum LBA value associated with the hyper-drive address space. In some implementations, an operating system is operable to write files starting at the beginning of an address space. If the operating system is agnostic to the physical drive layout of a hyper-drive, then a hyper-drive utility can move files between the physical drives to optimize performance of the hyper-drive. Moving files between drives can include reading data of the file, using a new LBA to be associated with the file, and writing file data to the new LBA. In some implementations, the utility can cause the operating system to have pre-defined LBA ranges for one or more types of files. Such pre-defined ranges can correspond to a SSD of a hyper-drive. In some implementations, hyper-drive address space can include the range [LBA 0, LBA N] being assigned to a HDD and the range [LBA N+1, MAX_LBA] being assigned to a SSD.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A data processing apparatus comprising:
   a processor;
   a controller coupled with the processor;
   a solid state drive coupled with the controller;
   a mass storage drive coupled with the controller; and
   a disk filter driver programmed to virtualize at least a portion of the solid state drive and the mass storage drive as a single physical storage drive;

wherein multiple applications stored in the virtualized single physical storage drive are configured to run on the processor;

wherein one or more applications in a hot application group are stored in the solid state drive, and one or more applications in a cold application group are stored in the mass storage drive;

wherein each of the multiple applications is actively monitored and placed in either the hot application group or the cold application group; and wherein the data processing apparatus comprises an operating system file system driver that is not aware that the single physical storage drive is virtualized from the at least a portion of the solid state drive and the mass storage drive; and a bridge driver programmed to translate commands from the disk filter driver for the solid state drive.

2. The data processing apparatus of claim 1,
wherein the mass storage drive is a first mass storage drive, the at least a portion of the solid state drive is a first extent in the solid state drive, the apparatus comprises a second mass storage drive, and a second extent in the solid state drive and the second mass storage drive are virtualized as another single physical storage drive.

3. The data processing apparatus of claim 1, wherein the controller comprises dual controllers, a first of the dual controllers being for the solid state drive, and a second of the dual controllers being for the mass storage drive.

4. The data processing apparatus of claim 1, wherein the virtualized single physical storage drive is a hyper solid state drive.

5. The data processing apparatus of claim 1, wherein the solid state drive comprises NAND Flash memory.

6. The data processing apparatus of claim 1, wherein the mass storage drive comprises a disk drive.

7. The data processing apparatus of claim 6, wherein the disk drive comprises an optical drive.

8. A method comprising:
running multiple applications on a processor, which is coupled with a controller, which is coupled with a solid state drive and a mass storage drive;

virtualizing at least a portion of the solid state drive and the mass storage drive as a single physical storage drive;

storing the multiple applications in the virtualized single physical storage drive, including storing one or more hot applications in the solid state drive and one or more cold applications in the mass storage drive; and actively monitoring each of the multiple applications to identify it as either a hot application or a cold application;

wherein the virtualizing is performed by a disk filter driver, and the method comprises using a bridge driver to translate commands from the disk filter driver for the solid state drive.

9. The method of claim 8,
wherein the mass storage drive is a first mass storage drive, the at least a portion of the solid state drive is a first extent in the solid state drive, and the method comprises virtualizing a second extent in the solid state drive and a second mass storage drive as another single physical storage drive.

10. The method of claim 8, wherein the controller comprises dual controllers, the method comprises using a first of the dual controllers for the solid state drive and using a second of the dual controllers for the mass storage drive.

11. The method of claim 8, comprising presenting the virtualized single physical storage drive as a hyper solid state drive.

12. The method of claim 8, wherein the solid state drive comprises NAND Flash memory.

13. The method of claim 8, wherein the mass storage drive comprises a disk drive.

14. The method of claim 13, wherein the disk drive comprises an optical drive.

* * * * *